UNITED STATES PATENT OFFICE.

FRIEDRICH KRAFFT AND ALFRED ROOS, OF HEIDELBERG, GERMANY.

PROCESS OF MAKING ESTERS.

SPECIFICATION forming part of Letters Patent No. 549,728, dated November 12, 1895.

Application filed May 11, 1894. Serial No. 510,903. (Specimens.)

*To all whom it may concern:*

Be it known that we, FRIEDRICH KRAFFT, professor and doctor of philosophy, a subject of the King of Prussia, German Emperor, and ALFRED ROOS, a citizen of the United States of America, residing at Heidelberg, in the Grand Duchy of Baden, Germany, have invented a new and useful Process of Preparing Acid Esters, Phenol Ethers, and other Ethers by Means of Aromatic Sulfonic Acids, of which the following is a specification.

Our invention consists in the formation of esters—in particular, formic-acid methyl esters, acetic-acid ethyl esters and their homologues, and esters of other carbon acids—by the combined action of alcohols and carbon acids on benzene sulfonic acid, benzene disulfonic acid, ptoluene sulfonic acid, beta-naphthalene sulfonic acid, and other sulfonic acids, which owing to their stability and other properties are fit therefor.

By heating sulfonic-acid esters with acids the esters of the latter and free sulfonic acids are obtained. So, for instance, benzene sulfonic-acid ester heated with acetic acid to a temperature of from 140° to 150° centigrade is decomposed into acetic-acid ethyl ester and benzene sulfonic acid.

$$C_6H_5.SO_2.OC_2H_5 + CH_3CO.OH = C_6H_5.SO_2OH + CH_3CO.O.C_2H_5.$$

If to a suitably-heated sulfonic acid an acid and an alcohol are added, the ester of the sulfonic acid is first produced, and then, according to the equation above indicated, the conversion into sulfonic acid and the ester of the corresponding acid takes place at once by the acid present. So, for instance, by adding in a continuous current a mixture of acetic acid and ethyl alcohol to beta-naphthalene sulfonic acid heated to a temperature of from 115° to 135° centigrade, the distillate will contain, besides acetic acid and alcohol, acetic-acid ethyl ester and water, while the sulfonic acid is continuously regenerated. In this ester formation the two following phases will take place:

$$C_{10}H_7SO_2OH + C_2H_5OH = C_{10}H_7.SO_2.OC_2H_5 + HOH;$$
$$C_{10}H_7.SO_2OC_2H_5 + CH_3CO.OH = C_{10}H_7SO_2OH + CH_3CO.OC_2H_5.$$

With the raw acetic ester produced by the sulfonic-acid process are mixed, besides water, alcohol and acetic acid, for which reason it must be further treated with known reagents. By using equivalent quantities of alcohol and acid ethyl ether is formed always in only extremely small quantities. It can be detected and, if required, removed by distilling the previously-purified acetic ester in the column apparatus. In exactly the same manner the esters of other acids are obtained—so, for instance, the butyric-acid ethel ester by adding a mixture of butyric-acid and ethyl alcohol to beta-naphthalene sulfonic acid at a temperature of about from 125° to 135° centigrade.

For manufacturing esters (or ether) having a higher boiling-point the treatment may be effected in a more or less complete vacuo, so that the production of the ester and the process become continuous, liquid acids mixed with alcohols are added, while solid acids are preferably added separately. If substances having a higher boiling-point are manufactured under ordinary pressure, they may be separated from the reaction-mixture in another manner—for instance, by distilling. Benzoic acid, for instance, is converted into benzoic-acid ethyl ester by causing ethyl alcohol to flow in a moderate excess at a temperature of from 120° to 140° through a mixture of benzoic acid and nearly the equal weight of a sulfonic acid; but this ester, which boils at a temperature of 213°, only partly distils over, and the portion remaining in the vessel is separated from the cooled mass by adding water and removing the same. After the expulsion of the water added thereto the sulfonic acid may be employed again.

The advantages of the sulfonic-acid process in its above-cited applications, when compared with the older process in which sulfuric acid is used, are based on the properties of the sulfonic acids explained in a prior patent, No. 516,766, granted to us March 20, 1894.

The sulfonic acids cited in the beginning of this specification are, moreover, fit for the etherification, principally, of such aromatic compounds in which sulfuric acid cannot be used, because their capacity to form sulfonic acids acts in an impeditive manner.

Unlike sulfuric acid the sulfonic acids act, as a rule, only toward the production of ether and form no other sulfonic acids. It is only exceptionally and at high temperatures that they obstruct the production of ether by the formation of other sulfonic acids. The numerous carbon acids not belonging to the class of fatty substances may therefore be converted into ethers exactly in the same way as above described. Furthermore, phenols (naphtols, diphenols, &c.) and their homologues and products of substitution, also aromatic alcohols, such as benzylic alcohol, the tolyl alcohols, moreover compounds uniting in themselves the functions of these different classes of substances, such as aromatic oxy-acids, may be converted into ethers in the same way. In these and in similar cases where sulfuric acid does not appear to be applicable, sulfonic acids may be used with more or less advantage in the etherification process. So, for instance, we obtain from phenol, by the mediation of beta-naphthalene, sulfonic acid; by passing through methyl alcohol at a temperature of from 120° to 140° the anisol, ($C_6H_5.O.CH_3$,) the boiling-point of which is 152°; by passing through ethyl alcohol we obtain the phenetol, ($C_6H_5.O.C_2H_5$,) the boiling-point of which is 172°.

The liquid alpha methyl ether, ($C_{10}H_7.O.CH_3$,) the boiling-point of which is at about 265° centigrade, is produced from alpha-naphthol by causing a solution of alpha-naphthol in about four times its weight of methyl-alcohol to flow through heated sulfonic acid, such as beta-naphthalene sulfonic acid at a temperature of about 140° to 145° centigrade; also, diphenols may completely be etherified—for instance, resorcin, which, dissolved in from six to eight times its weight of methyl-alcohol and treated in precisely the same manner as the above-mentioned solution of the alpha-naphthol, gives abundant quantities of its liquid dimethyl-ether, ($C_6H_4(OCH_3)_2$,) the boiling-point of which is about 214° centigrade, and which may easily be separated by alkalies from the free resorcin or the monomethyl-ether; but while in the carbon acids by the use of one or two molecules of the corresponding alcohol a good yield of esters is obtained a larger excess of alcohols is ordinarily necessary for the etherification of the phenols, and while in the carbon acids also under less favorable conditions in addition to the esters the ethers (say besides the acetic acid ethyl ester the ethyl ether) are produced in only very small quantities in addition to phenetol—for instance, the ethyl ether is easily produced in an abundant quantity; but as the ethyl ether can also easily be separated the production of same offers no essential trouble.

The remarkably easier etherification of the carbon acids in comparison with the phenols allows to be prepared by means of sulfonic acids also esters of the oxyacids, such as salicylic-acid ethyl ester, ($O-C_6H_4(OH).CO_2C_2H_5$,) the boiling-point of which is at about 226° centigrade. The said ester is produced by causing a solution of salicylic acid in ethyl-alcohol to flow through beta-naphthalene sulfonic acid at a temperature of from 145° to 150° centigrade. The product is purified in the same manner as the benzoic ester, as above said.

What we claim as new is—

1. The process herein described for the production of esters, by the action of an alcohol and a carbon acid in the presence of a sulfonic acid.

2. The process herein described for the production of esters, by the action of an alcohol and a carbon acid in the presence of an aromatic sulfonic acid.

3. The process herein described for the production of esters, by the action of an alcohol and a carbon acid at a temperature above 100° centigrade in the presence of an aromatic sulfonic acid.

In testimony whereof we have signed our names to this specification in the presence of two subscribing witnesses.

F. KRAFFT.
A. ROOS.

Witnesses to Friedrich Krafft:
A. B. BEYRENTHER,
GEORG BECK.

Witnesses to Alfred Roos:
T. GORSCHALK,
FRITZ SCHRÖDER.